Jan. 19, 1965 R. R. BROWN ETAL 3,166,371
WATERPROOF ELECTRICAL CONNECTOR
Filed Sept. 13, 1962
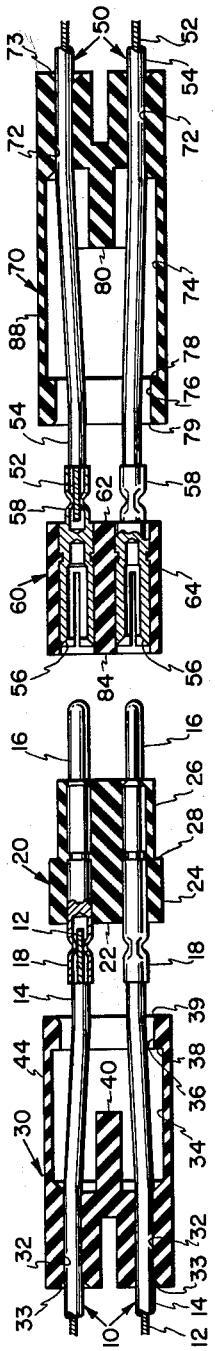
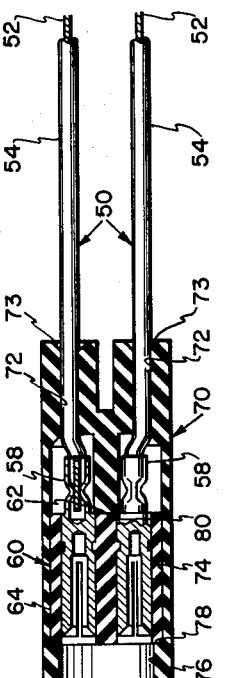
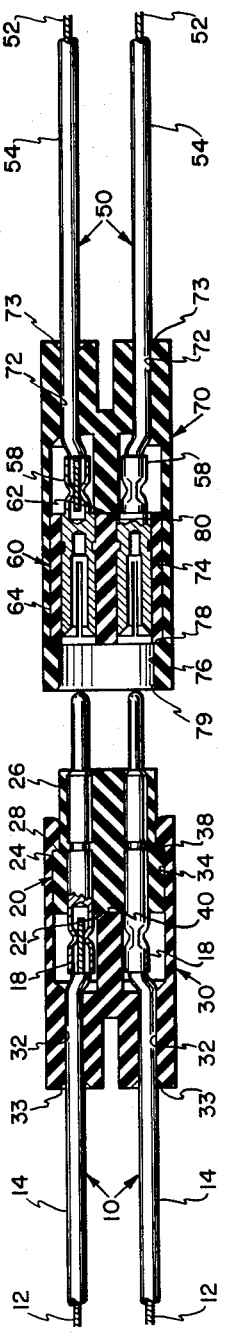
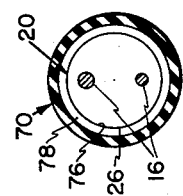
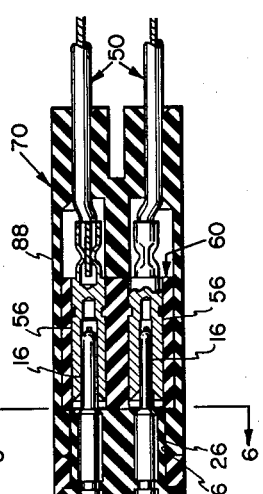
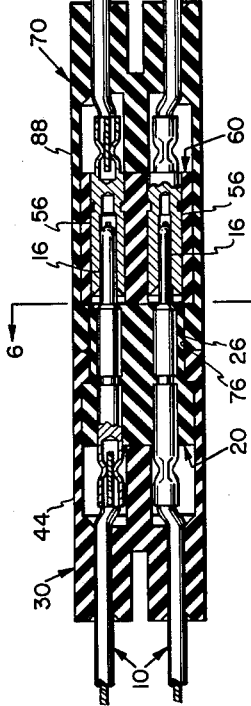
INVENTORS
ROBERT R. BROWN
LEONARD E. DAUM
BY *Arthur Jacobs*
ATTORNEY

United States Patent Office 3,166,371
Patented Jan. 19, 1965

3,166,371
WATERPROOF ELECTRICAL CONNECTOR
Robert R. Brown, Bernardsville, and Leonard E. Daum, Morristown, N.J., assignors to Elastic Stop Nut Corporation of America, Union, N.J., a corporation of New Jersey
Filed Sept. 13, 1962, Ser. No. 223,436
1 Claim. (Cl. 339—60)

The present invention relates generally to electricity and more specifically to electrical connectors and to electrical connections in which an electrical circuit is completed between a plurality of conductors through the employment of such connectors.

Where the use of electrical cables requires that the cables be exposed to adverse elements by being placed on the surface of the ground, directly buried in the ground or immersed in water, difficulties have been experienced in providing electrical joints or connections which may readily be fabricated in the field and may be used with safety in such installations. Electrical connectors have been developed which are integrally molded to connecting cables and which provide the necessary degree of resistance to water and other elements which will have an adverse effect upon electrical cable connections, but these connectors have the disadvantage of not being readily fabricated in the field and are limited to factory installation, thus requiring that the length of cable between such connectors be specified at the factory. Because it is often difficult to specify such lengths with a practical degree of accuracy, it would be highly desirable to have available a connector which may readily be attached to a cable in the field and which would exhibit the necessary resistance to adverse elements while providing a good electrical connection.

It is therefore a primary object of the invention to provide an electrical connector which may be conveniently applied in the field, the use of which will result in a efficient electrical connection affording safety in installations on the surface of the ground, directly buried in the ground or immersed in water.

Another object of the invention is to provide male and female electrical connector elements, either of which may be applied in the field at any desired location in a cable to mate with any complementary connector element to form an effective electrical connection.

It is a further object of the invention to provide male and female connector elements both of which are comprised of component parts which are capable of being readily assembled in the field to enable fabrication of an efficient, readily disconnectable electrical connection at any desired location in a cable.

Briefly, the invention may be described as a waterproof electrical connector element for use at the terminus of a set of leads, each lead being comprised of an electrical conductor covered with insulating material, said connector element comprising a first member of insulating material, a set of electrical contacts fixed in said first member and electrically connected to each of said conductors of said set of leads, and a second member of insulating material cooperating with said leads and with said first member such that the electrical connections established between said conductors and said set of contacts are protectively sealed within said connector element. In addition, a protective seal is provided by cooperating portions of complementary connector elements in an electrical connection between two such sets of leads.

The above and other objects and advantages will become evident from the following description of a preferred embodiment of the invention and the accompanying drawings thereof in which:

FIGURE 1 is a sectional view of the component parts of a male electrical connector element partially assembled;

FIGURE 2 is a sectional view of a male connector element of FIGURE 1 with the parts assembled;

FIGURE 3 is a sectional view of the component parts of a female electrical connector element partially assembled;

FIGURE 4 is a sectional view of a female connector element of FIGURE 3 with the parts assembled;

FIGURE 5 is a sectional view of an electrical connection made between the connector elements of FIGURES 2 and 4; and FIGURE 6 is a cross-section taken along line 6—6 of FIGURE 5.

In FIGURE 1 the component parts of a male electrical connector element are shown partially assembled at the terminus of a first set of leads 10, each lead being comprised of an electrical conductor 12, which may be solid or stranded, and a covering 14 including insulating material. The leads 10 are each electrically connected to an electrical contact shown in the form of a pin 16 provided with a ferrule 18 which receives the end of a lead that has been skived to remove the covering and expose a given length of conductor, the exposed length of each conductor 12 being secured to each pin 16 as by crimping the ferrules 18 in a well known manner. In order to locate the pins in a definite position relative to one another, the pins are fixed or firmly embedded in a member of insulating material, illustrated in the form of an insert 20, with the ferrules 18 protruding from the rear face 22 of the insert 20 so that the conductors may readily be attached to the pins 16 after the pins 16 are immovably anchored in the insert 20. The insert 20 is generally cylindrical in cross-section (see FIGURE 6) and has an external surface provided with a larger diameter portion 24 and a smaller diameter portion 26 with a shoulder 28 therebetween for a purpose which will be hereinafter explained.

To attain the objective of providing a connector which may safely be employed in locations exposed to the elements as aforesaid, a member illustrated in the form of a generally cylindrical continuous casing 30 is fitted over the leads 10 and the insert 20 to cooperate with the leads and the insert, in a manner best illustrated in FIGURE 2, to protectively encase and seal the electrical connections at ferrules 18 against the action of such elements. The casing 30 is molded of a resilient material and in order to be fully satisfactory should possess certain additional properties of which the following are important. The material should be non-porous to both gases and liquids and should be substantially impervious to acids and alkalis of the kind and concentrations ordinarily encountered in earth installations. It should be substantially impervious to deterioration from the action of the atmosphere, particularly with reference to sun rays. It should be capable of resisting, without adversely affecting its mechanical and electrical properties, extremes of temperature conditions from subzero temperatures to the high temperatures encountered in above ground installations in tropic or desert locations. It should be relatively firm and non-frangible and must have a certain degree of elasticity. It should be as free as possible from inherent "aging" with time. It should have reasonably good physical properties, particularly the quality of toughness and should have relatively high dielectric strength. Flexible cables suitable for direct ground burial have previously been employed and in the development of such cables, it has been found that in the present state of the materials art, the class of materials which most satisfactorily meets requirements of the nature of those noted above are synthetic polymers of compounds productive of products generically known as "synthetic rubber," of which the following may be mentioned as examples, each of which possesses the aforesaid properties to a greater or lesser extent: "GR–S" (Government rubber, styrene) a polymeric product of butadiene and styrene; "low temperature rubber," also a polymeric product of butadiene and styrene; "neoprene," which is a generic term for a number of chloroprene polymers of different grades and designated as "GR–M" plus numerical designations for the several grades; "Butyl rubber," a copolymer of isobutylene and isoprene; and "Buna N" ("GR–A," Government rubber, acrylonitrile), a copolymer of butadiene and acrylonitrile. To those skilled in the materials art it will be evident that a substantial variety of materials suitable for the purposes are available. Such other materials may include synthetic resins such as "polythene." Also, while it is possible to mold a casing from natural rubber, the use of natural rubber is not to be recommended because of its inherent deterioration with time, or so-called "aging" characteristics. The specific material employed will therefore be dictated by specific conditions in different cases.

Of the foregoing materials, properly compounded neoprene is highly satisfactory and for purposes of further description herein it will be assumed, without limitation, that neoprene is the material employed.

Referring now to FIGURES 1 and 2, individual passages 32 are provided in the casing 30 for each lead 10, the relative normal diameters of the passages 32 and the leads 10 being such that the latter may be passed through the former by hand in an interference or friction fit which will provide what may be called a "water seal" along their mating surfaces to prevent water from entering the connector element and approaching the electrical connections between conductors 12 and pins 16 through the passages 32. Such hand insertion of the leads 10 is accomplished prior to insertion of the conductors 12 into the ferrules 18 and is facilitated by the provision of chamfers 33 at the entrance to each of the passages 32.

Casing 30 has an internal cylindrical surface provided with a larger diameter portion 34 and a smaller diameter portion 36 with a shoulder 38 therebetween. The relative normal diameters of the internal surface portions 34 and 36 and the corresponding external surface portions 24 and 26 of the insert 20 are such that the latter also may be inserted into the former by hand, the resilient property of the casing 30 permitting the casing to be radially expansible thereby allowing a slight dilation of the internal surface of the casing 30 to admit the insert 20 and set up an interference fit between surfaces 34 and 24, thus providing a second water seal along these overlapping surfaces (see FIGURE 2) to prevent water from approaching the electrical connections at ferrules 18 along these surfaces. In order to facilitate the insertion, a small radius 39 is provided at the entrance to the internal surface of the casing 30. Once the insert 20 is properly seated within the casing 30, as illustrated in FIGURE 2, rear face 22 of the insert abuts the land 40 of the casing 30 provided therefor and shoulder 38 engages shoulder 28 of the insert to locate and retain the insert 20 in the casing 30 and provide a sturdily assembled electrical connector element sealed against the action of adverse elements upon the electrical connections contained therein. Internal surface 36 of casing 30 complementally engages external surface portion 26 of the insert 20 without interference, thus maximizing the retaining power of the casing material. External surface 44 of the casing 30 provides a grip for purposes which will be explained later.

In attaching a connector of the invention to the terminus of a set of leads, the leads are first passed through the passages provided therefor in the casing and pulled to a position shown in FIGURE 1. Then the insert, which may be supplied from the factory with the pins already having been embedded therein as by molding the insert around the pins, is secured to the ends of the leads by skiving the leads, inserting the exposed conductors into the ferrules and crimping the ferrules. The casing is then drawn along the leads and slipped over the insert to complete the assembly illustrated in FIGURE 2. Both the passing of the leads through the passages and the insertion of the insert into the casing may be facilitated by the use of a lubricant, helping to assure that the installation may readily be carried out in the field in a rapid and efficient manner.

Referring now to FIGURES 3 and 4, a female electrical connector element is illustrated, first in a partially assembled configuration in FIGURE 3 and then fully assembled in FIGURE 4 at the terminus of a second set of leads 50 having conductors 52 therein. The general construction is similar to that of the male connector element described above; however, certain important differences will now be pointed out.

The leads 50 are each skived at their ends to remove a portion of the covering 54 and expose the conductors 52 which are then electrically connected to electrical contacts, here shown in the form of sockets 56 which are complementary to pins 16 and are adapted to receive the pins 16 in separable engagement therewith, the conductors 52 being secured in the ferrules 58 by crimping or the like. To fix each socket 56 in its proper position, the sockets are immovably embedded in a member of insulating material, illustrated in the form of an insert 60, with ferrules 58 protruding from the rear face 62 of the insert 60 which has a cylindrical external surface portion 64.

The continuous casing 70 is fitted over the leads 50 and the insert 60 in the manner set forth in the above description of the male connector element with leads 50 passing through passages 72 of the casing 70, each passage having a chamfered opening 73. However, as best seen in FIGURES 4 and 5, the configurations of the casing 70 and the insert 60 are such that the entire portion 64 of the external surface of the insert 60 is overlapped by the larger diameter portion 74 of the internal surface of the casing 70 while the smaller diameter portion 76 of the internal surface, which extends beyond shoulder 78 of the casing 70, projects beyond the insert 60. A small radius 79 aids in easing the insertion of insert 60 into casing 70, and once the insertion is accomplished, the shoulder 78 and the land 80 of casing 70 cooperate with the front face 84 and the rear face 62, respectively, of the insert 60 to locate and retain the insert 60 within the casing 70 with an interference fit between the casing 70 and both the insert 60 and the leads 50 providing water seals at the overlapping surfaces, passages 72 overlapping with the coverings 54 of the leads 50 and portion 74 of the internal surface of the casing 70 overlapping with the external surface portion 64 of the insert 60 to prevent water from entering the connector element and approaching the electrical connections between the conductors 52 and the sockets 56 at ferrules 58. The external surface 88 of the casing 70 also provides a grip for a purpose which will be explained shortly.

As best seen in FIGURE 5, the male and female connector elements may be brought together to complete an electrical connection between the two sets of leads 10 and 50 with the pins 16 separably engaging sockets 56 in electrical connection therewith in a known manner. The relative diameters of the portion 26 of the external surface of the insert 20 and the portion 76 of the internal surface of the casing 70, which is resiliently dilatable as aforesaid, are such that the casing 70 overlaps the insert 20 in an interference fit therewith and forms a water seal along these mating surfaces, the water seal serving to prevent water from reaching the electrically connected contacts and providing the requisite safety in an electrical connection which is to be employed in the aforesaid installations. The external surfaces 44 and 88 of the respective casings provide convenient hand grips for effecting the connection or disconnection of the male and female connector elements to optionally form an electrical connection.

It is noted in FIGURES 5 and 6 that one pin 16 and one socket 56 are each made larger in diameter than the other pin and socket in order to orient or "polarize" the individual connectors with respect to one another in an electrical connection.

For purposes of illustration, both the male and female connector elements of the connection shown in FIGURE 5 have been depicted as being assembled of a series of component parts; however, it will be readily apparent to those skilled in the art that either a male or female connector element having the construction shown may be separably joined to a connector element having a complementary configuration, but having been molded integral with the leads in the factory. Thus, the invention provides male and female connector elements, either of which may be applied in the field at any desired location in a cable to mate with any complementary connector element, or both of which may be applied in the field to enable, in either case, the fabrication of an efficient, readily disconnectable waterproof electrical connection at any desired location in a cable.

It is to be understood that the above detailed description of a preferred embodiment of the invention is provided by way of example only and is not intended to restrict the invention. Various details of design and construction may be modified without departing from the true spirit and scope of the invention as defined in the appended claim.

We claim:

A waterproof electrical connection having component parts capable of being assembled in the field to establish an electrical connection between a first set of leads and a second set of leads, each lead being comprised of an electrical conductor and a covering of insulating material, said component parts comprising:

(A) a first connector element including
 (1) a first insert of resilient insulating material having an axially extending external surface bounded by radial front and rear faces,
 (2) a first set of electrical contacts fixed in said insert for being mechanically secured and electrically connected to the conductors of the first set of leads,
 (3) a first continuous unitary casing of resilient insulating material for receiving and securing said insert therein after the contacts are secured to the conductors;

(B) a second connector element including
 (1) a second insert of resilient insulating material having an axially extending external surface bounded by radial front and rear faces,
 (2) a second set of electrical contacts complementary to said first contacts and fixed in said second insert for being mechanically secured and electrically connected to the conductors of the second set of leads,
 (3) a second continuous unitary casing of resilient insulating material for receiving and securing said second insert therein after the second contacts are secured to the conductors; and (C) means for mechanically securing the first connector element to the second connector element and establishing an effective, watertight electrical connection between corresponding first and second contacts within the secured elements, said means including
 (1) a generally cylindrical portion in the first insert extending axially along a portion of said first set of contacts and including a generally cylindrical continuous external surface for projecting beyond the axial extent of the first casing when the first insert is received within the first casing such that the first face of the insert is axially displaced beyond the axial extent of the casing,
 (2) a generally cylindrical resiliently dilatable internal surface in the second casing for projecting beyond the first face of the second insert when the second insert is received within the second casing such that the first face of the second insert is displaced from the axial extent of the second casing, said internal surface having an internal diameter less than the external diameter of said generally cylindrical axially projecting external surface of the first insert for receiving and overlapping with said external surface of the first insert with the external surface of the first insert resisting radial contraction and effecting radial dilation of the internal surface of the second casing so as to establish an interference fit therewith having sufficient strength to mechanically secure the first element to the second element and maintain said electrical connection,
 (3) the axial displacement of the first face of the first insert beyond the axial extent of the first casing and the axial displacement of the first face of the second insert from the axial extent of the second casing being great enough so that upon securing the first element to the second element the first insert will enter the second casing axially far enough to allow the generally cylindrical portion of the first insert to reinforce the connection at the juncture of the casings and resist forces tending to bend the connection and the contacts at said juncture.

References Cited in the file of this patent

UNITED STATES PATENTS

| | | |
|---|---|---|
| 2,015,590 | Cavanagh et al. | Sept. 24, 1935 |
| 2,125,555 | Frantz | Aug. 2, 1938 |
| 2,409,004 | Wall | Oct. 8, 1946 |
| 2,563,712 | Frei et al. | Aug. 7, 1951 |
| 2,787,770 | Arson | Apr. 2, 1957 |
| 2,984,811 | Hennessey et al. | May 16, 1961 |
| 3,020,516 | Despard | Feb. 6, 1962 |

FOREIGN PATENTS

| | | |
|---|---|---|
| 2,490,013 | Great Britain | Aug. 5, 1938 |